(12) United States Patent
North et al.

(10) Patent No.: US 12,189,410 B2
(45) Date of Patent: Jan. 7, 2025

(54) MANAGING ELECTRIC VEHICLE LOADS ON A HOME NETWORK

(71) Applicant: Recargo, Inc., El Segundo, CA (US)

(72) Inventors: Forrest North, El Segundo, CA (US); Nick Wild, El Segundo, CA (US)

(73) Assignee: Recargo, Inc., El Segundo, CA (US)

( * ) Notice: Subject to any disclaimer, the term of this patent is extended or adjusted under 35 U.S.C. 154(b) by 548 days.

(21) Appl. No.: 17/526,433

(22) Filed: Nov. 15, 2021

(65) Prior Publication Data

US 2022/0129029 A1 Apr. 28, 2022

Related U.S. Application Data

(63) Continuation of application No. 15/451,233, filed on Mar. 6, 2017, now Pat. No. 11,175,687.

(60) Provisional application No. 62/303,641, filed on Mar. 4, 2016.

(51) Int. Cl.
| | |
|---|---|
| *G05F 1/66* | (2006.01) |
| *B60L 53/63* | (2019.01) |
| *B60L 58/12* | (2019.01) |
| *H02J 3/14* | (2006.01) |
| *H02J 7/00* | (2006.01) |

(52) U.S. Cl.
CPC ............... *G05F 1/66* (2013.01); *B60L 53/63* (2019.02); *B60L 58/12* (2019.02); *H02J 3/14* (2013.01); *H02J 7/0071* (2020.01); *H02J 2310/14* (2020.01); *Y02B 70/30* (2013.01); *Y02B 70/3225* (2013.01); *Y02T 90/167* (2013.01); *Y04S 20/222* (2013.01); *Y04S 20/242* (2013.01); *Y04S 30/12* (2013.01)

(58) Field of Classification Search
None
See application file for complete search history.

(56) References Cited

U.S. PATENT DOCUMENTS

| | | | | |
|---|---|---|---|---|
| 2012/0086397 | A1* | 4/2012 | Obayashi | B60L 55/00 320/109 |
| 2012/0112696 | A1* | 5/2012 | Ikeda | H01M 10/48 320/109 |
| 2015/0280432 | A1* | 10/2015 | Lam | B60L 53/665 307/38 |

\* cited by examiner

*Primary Examiner* — Jared Fureman
*Assistant Examiner* — Joel Barnett
(74) *Attorney, Agent, or Firm* — AMPACC Law Group, PLLC

(57) ABSTRACT

Systems and methods for managing a home electrical network or system, such as managing loads applied to the network by one or more associated electric vehicles, are described. For example, the systems and methods predict or estimate use of a home electrical network (e.g., via a charging station connected to the network) by one or more electric vehicles, and manage use or operation of other devices on the home network accordingly.

16 Claims, 5 Drawing Sheets

MANAGING ELECTRIC VEHICLE LOADS ON A HOME NETWORK

CROSS-REFERENCES TO RELATED APPLICATIONS

This application is a continuation of U.S. application Ser. No. 15/451,233 filed Mar. 6, 2017, now U.S. Pat. No. 11,175,687, issued Nov. 16, 2021, which claims the benefit of U.S. Provisional Patent Application No. 62/303,641, filed on Mar. 4, 2016, entitled MANAGING ELECTRIC VEHICLE LOADS ON A HOME NETWORK, which is incorporated by reference in its entirety.

BACKGROUND

Although the adoption of electric vehicles is increasing, there are still many people that find them confusing or inaccessible, or are otherwise not interested in using electric vehicles for their transportation needs. Therefore, technology is being developed to remove such barriers and provide benefits to new and early adopters of electric vehicles.

DETAILED DESCRIPTION

Overview

Figure 1:
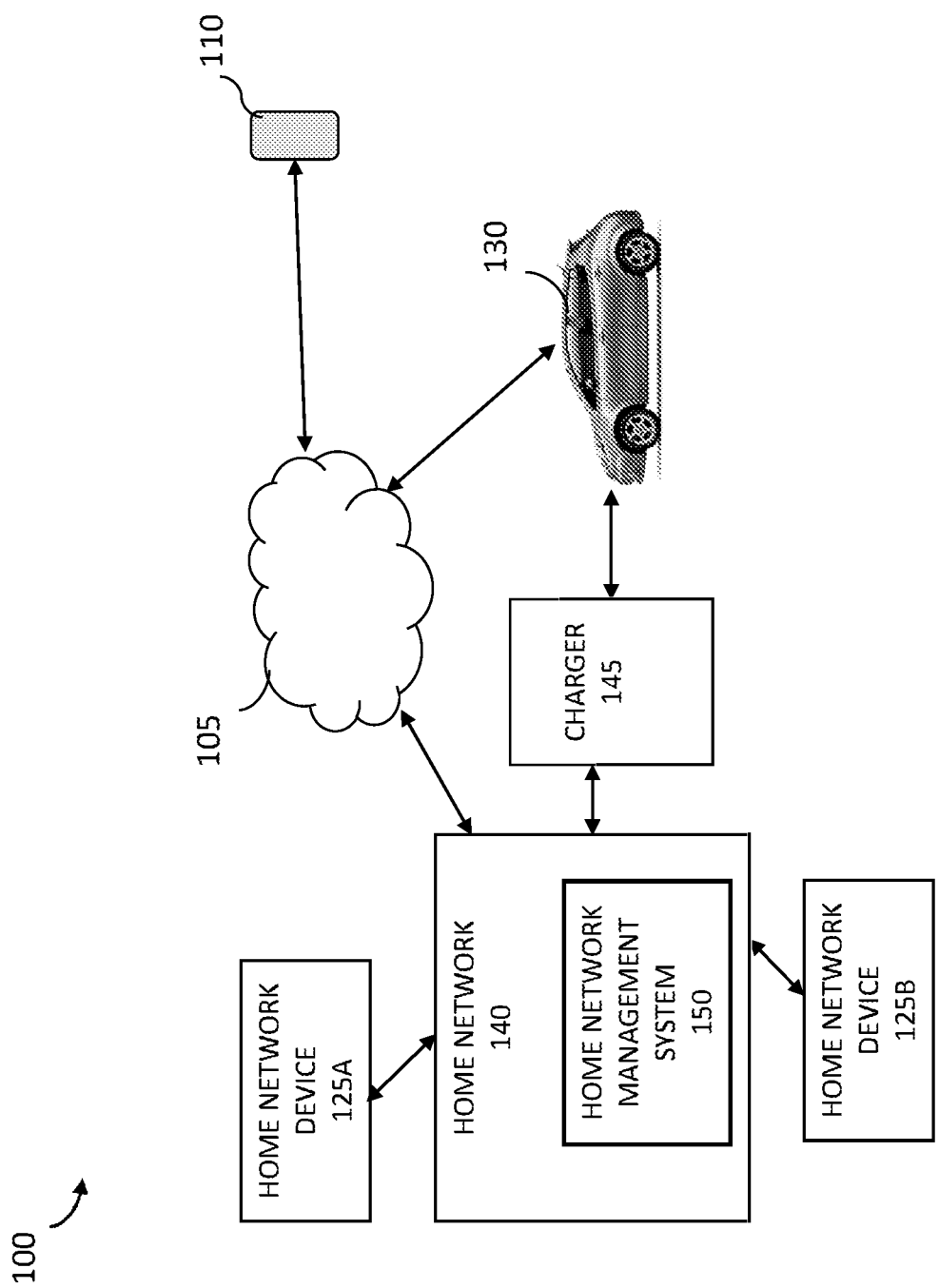
FIG. 1 is a block diagram illustrating components of a suitable computing environment.

Systems and methods for managing a home electrical network or system, such as managing loads applied to the network by one or more associated electric vehicles, are described. For example, the systems and methods predict or estimate use of a home electrical network (e.g., via a charging station connected to the network) by one or more electric vehicles, and manage use or operation of other devices on the home network accordingly.

In some embodiments, the systems and methods may access information for an associated electric vehicle (such as information identifying a predicted time window in which the electric vehicle is to be charged via a charger connected to the home network), determine one or more current or predicted conditions applied to the home network (such as current or anticipated load or frequency conditions based on other devices operating on the home network), and perform an action associated with the home network, such as to manage, control, modify, and/or adjust the operation of other devices of the home network.

Additionally, in some embodiments, the systems and methods may manage or control charging operations of electric vehicles based on information or conditions associated with the home networks and/or its associated devices. For example, the systems and methods may control charging of an electric vehicle at a charging station connected to a home electrical system or network by determining that an operation condition associated with a total load currently applied to the home electrical system by one or more devices (e.g., non-vehicles, such as air conditioning systems, heating systems, and so on), satisfies a threshold charging condition for the network, and cause the charging station to charge the electric vehicle, or otherwise control charging of the electric vehicle.

Thus, a home electrical network or system may continuously monitor and determine certain load conditions of the network caused by devices having known or consistent use of the network (e.g., heating or cooling systems), in order to manage the overall load or increased load applied to the network (e.g., selectively turn on or off various home network devices) in advance of or when an electric vehicle connects to the network and charges its batteries, among other benefits.

It is intended that the terminology used in the description presented below be interpreted in its broadest reasonable manner, even though it is being used in conjunction with a detailed description of certain specific embodiments of the system. Certain terms may even be emphasized below; however, any terminology intended to be interpreted in any restricted manner will be overtly and specifically defined as such in this Detailed Description section.

Examples of a Suitable Network Environment

Systems and methods for managing a home electrical network or system based on predicted or anticipated use or the home network for charging an associated electric vehicle, and/or managing the charging of the associated electric vehicle based on a current or future use of other load or network devices (e.g., air conditioners, heaters, and so on) connected to the home network, are described. For example, a home electrical system may include and/or be controlled by a home network management system, which controls some or all of the electrical devices that receive power from the home electrical system.

FIG. 1 illustrates components of a suitable network environment 100 in which the systems and methods for performing actions associated with managing a home electrical network may be supported and/or implemented.

The computing environment 100 includes a mobile device 110, such as a smart phone or tablet computer that supports and provides applications (e.g., "apps") to a user of the mobile device 110, such as a driver of an electric vehicle 130 (e.g., an EV such as a vehicle, plugin hybrid, range extended hybrid, electric traction or battery or plugin vehicle) that is associated with a home electrical network 140, which is connected to various electric loads, such as home network devices 125A, 125B. Example home network devices 125A, 125B include air conditioning devices or systems, heating devices or systems, cooling devices or systems, other HVAC devices, electrical power devices, generators, central power or network systems, central heating, air conditioning, vacuum, or other central HVAC systems, and other devices that consume power provided by the home electrical network 140.

The mobile device 110 and/or the electric vehicle 130 (e.g., a computer network of the vehicle 130) may include an application that communicates with a home network management system 150 of or associated with the home network 140 over a network 105, such as the internet or other wireless or telecommunication networks.

For example, before or during a charging event (e.g., events when the electric vehicle 140 is charging), such as when the electric vehicle 130 uses a charger 145 connected to the home network 140, the mobile device 110 and/or the electric vehicle 130 may transmit and/or send information to the home network 140 identifying an expected home arrival time and/or use of the charger 145, information identifying a battery state or charge state of the electric vehicle 130, and so on.

The mobile device 110 may be a tablet computer, mobile device, smart-phone, net-book, mobile GPS navigation device, or any other device that supports, presents, and/or displays apps via a user interface, such as a touch-screen, of the device. The mobile device 110 and/or the electric vehicle 130 may include various hardware and/or software components in order to provide such functionality. For example, the mobile device 110 and/or the electric vehicle 130 may include various human interface components, processing components, device components, memory, and so on.

For example, the mobile device 110 and/or electric vehicle 130 may include a touch-screen or other input component that provides input to a processor. The touch-screen may include or communicate with a hardware controller, such as a touch-screen driver, that interprets raw signals received from the touch-screen and transmits information associated with a contact event (e.g., a pressing of an app via the touch-screen), to the processor. The touch-screen may be part of a display, such as a touch-screen display, a flat panel display, an electronic ink display, a head-mounted display, a liquid crystal display, a light-emitting diode display, a plasma panel display, an electro-luminescent display, a vacuum fluorescent display, a digital projector, a laser projector, a heads-up display, and so on. The mobile device 110 and/or electric vehicle 130 may include other interface components, such as a speaker that provides appropriate auditory signals to assist a user in navigating a touch-screen, and so on.

Further, the mobile device 110 and/or electric vehicle 130 may include various device components, such as sensors (e.g., GPS or other location determination sensors, motion sensors, gyroscopes, light sensors, and so on), removable storage devices (e.g., SIM cards), cameras and other video capture devices, microphones and other audio capture devices, communication devices (e.g., Bluetooth devices, radios, antennas), and so on.

The mobile device 110 and/or electric vehicle 130 may include a processor that communicates with data or applications stored in memory of the device 110, which may include a combination of temporary and/or permanent storage, and both read-only and writable memory (random access memory or RAM), read-only memory (ROM), writable non-volatile memory such as FLASH memory, hard drives, floppy disks, SIM-based components, and so on. The memory may include various program components or modules, such as an operating system, and various applications, such as applications downloaded to the device 110 or vehicle 130. For example, the memory may store applications native to the device that perpetually operate on the device (e.g., a keyboard application that provides a virtual keyboard, a text messaging application, and so on) as well as applications that are downloaded by a user and launched by the device (e.g., applications associated with social networking sites, games, and so on).

In some embodiments, one or more communication devices may be provided and/or integrated with the home network 140 and/or charging station 145. These communication devices may access and receive various types of data from the mobile device 110 and/or electric vehicle 130, such as data or information associated with a state of charge of the batteries of the electric vehicles, a state of a charging event (e.g., a state where an electric vehicle is charging, a state where the electric vehicle is not charging), and so on.

The network 105 may be a Local Area Network (LAN), a Wide Area Network (WAN), the Internet, various different telecommunication networks (4G, LTE, and so on), or other networks capable of facilitating various communications between computing devices. The mobile device 110 and/or electric vehicle 130 may include various communication components (e.g., Bluetooth) that facilitate short range, near field, and/or other direct or personal area network communications between devices. For example, the mobile device 110 and/or electric vehicle 130 may utilize Bluetooth communication to exchange data with the home network 140 and/or charger 145 when other networks are unavailable or inaccessible.

The electric vehicle 130 may include communication devices, may include various computing components and/or modules configured and/or programmed to control, manage, diagnose, or otherwise interact with components of the electric vehicle, the home network 140, and/or the charging station 145. For example, the computing components may include an on-board computing system that includes on-board diagnostics, such as components configured and/or programmed to detect and/or receive information from the electric vehicle's engine, battery pack, various sensors, dashboard controls, and so on. The components may detect, sense, and/or capture various types of information, such as outside temperature information, inside temperature information, internal engine or component temperatures, motor rpm information, motor temperature information, power consumption information, charger temperature information, information associated with peak power consumption, location or geographical information, tire pressure information, tire temperature information, information captured by seat pressure sensors, error codes or other operational information, and so on.

For example, the components may detect, receive, and/or access motor controller information, such as information associated with the power, voltage, current, frequency, waveform, modulation, and/or regenerative power of the motor of the EV, as well as information from modules which control ancillary functions of the EV, such as information associated with operations of the lights, wipers, anti-lock brakes, seat warmers, music, climate controls, light sensors, smoke sensors, acceleration sensors, and other ancillary operations of an EV. Furthermore, the computing components may detect, receive, and/or access charging information, such as charging state information, voltage information power information, current information, and so on.

A described herein, in some embodiments, the home network management system 150 controls and/or manages the loads applied to various devices 125A-B (e.g., the power provided to the devices) based on information identifying a current or predicted use of the home network 140 by the electric vehicle 130 during current or predicted charging events.

For example, the home network management system 150 may receive signals (e.g., including various information or data) from the home network 140, such as signals indicating a current, predicted, and/or average load condition of the home network 140, and/or information from the electric vehicle 130, such as information indicating a likely or predicted arrival at the home network, a predicted charging event time period, a state of the battery of the electric vehicle, and so on.

The home network management system 150 may schedule or otherwise modify the operation of current or future charging events based on the information, such as based on various market conditions or environmental conditions (e.g., pricing, cost, energy sources, and so on), based on load or other condition balancing of the home network 140, and so on. The home network management system 150 may modify charging events and/or schedule charging events within various different time frames, such as within a time period from when the electric vehicle 130 connects to the charger 145 of the home network 140 until a next use (predicted or otherwise) of the electric vehicle 130.

FIG. 1 and the discussion herein provide a brief, general description of a suitable computing environment in which the home network management system 150 can be supported and implemented. Although not required, aspects of the system are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible computer-readable storage media, such as non-transitory media), including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks) or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein. Moreover, any two or more of the machines, databases, or devices illustrated in FIG. 1 may be combined into a single machine, and the functions described herein for any single machine, database, or device may be subdivided among multiple machines, databases, or devices.

Examples of Managing Use of a Home Network by an Electric Vehicle

As described herein, the home network management system 150 includes components, modules, and/or engines that perform various algorithms, processes, and/or methods to manage electric vehicle loads on a home network 140. For example, the home network management system 150 may shape load conditions applied to the home network 140 by managing the operation of associated network devices 125A-B during or in anticipation of use of the home network 140 during a charging event associated with the electric vehicle 130.

Figure 2:
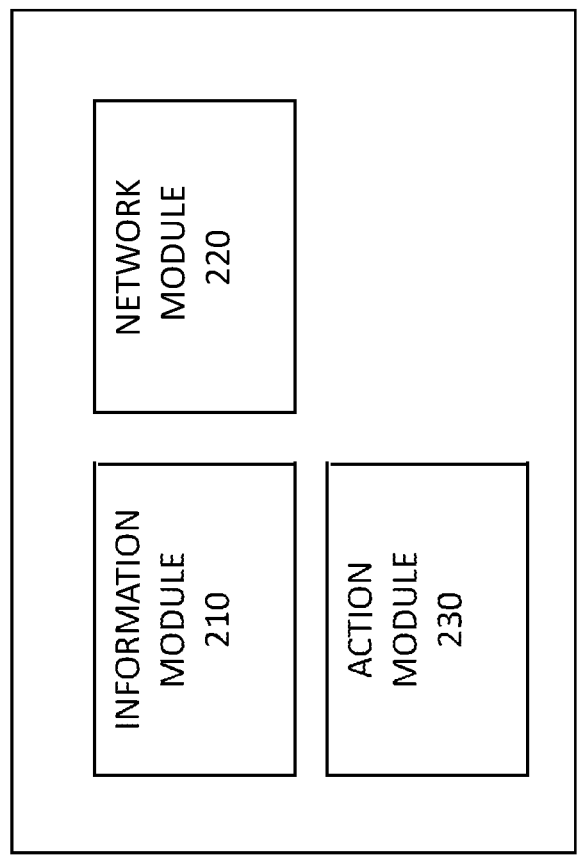
FIG. 2 is a block diagram illustrating the components of a home network management system.

FIG. 2 is a block diagram illustrating the components of the home network management system 150. In some example embodiments, the home network management system 150 may include one or more modules and/or components to perform one or more operations of the home network management system 150. The modules may be hardware, software, or a combination of hardware and software, and may be executed by one or more processors. For example, the home network management system 150 may include an information module 210, a network module 220, and an action module 230.

In some embodiments, the information module 210 is configured and/or programmed to access information for an electric vehicle associated with a home network. For example, the information module 210 may access information received from the mobile device 110 and/or the electric vehicle 130.

Example information may include information identifying a location of the electric vehicle 130 (e.g., a total distance between the location of the EV 130 and the home network 140), a route driven by the electric vehicle 130, an expected arrival time of the electric vehicle 130, information associated with a state of charge of the EV battery, and other information described herein.

In some embodiments, the network module 220 is configured and/or programmed to determine current conditions of the home network. For example, the network module 220 may identify a current load condition applied to the home network 140 by one or more currently operating network devices 125A-B, a predicted load condition applied to the home network 140 by one or more network devices 125A-B scheduled to operate during future time periods, and so on.

In some embodiments, the action module 230 is configured and/or programmed to perform an action to modify, adjust, or otherwise manage conditions of the home network 140, based on the information for the electric vehicle 130. For example, the action module 230 may control operation of one or more of the network devices 125A-B, such as by turning on the devices, turning off the devices, causing the devices to operate at lowered power levels, and so on.

Figure 3:
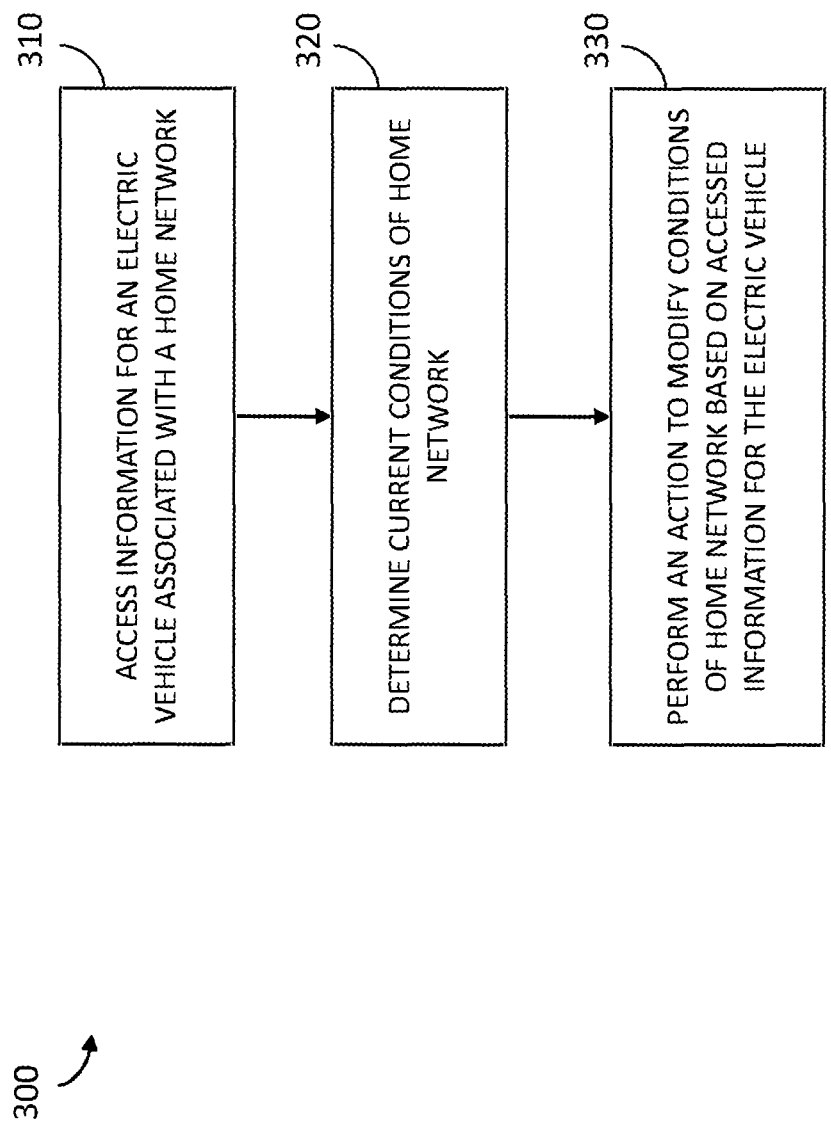
FIG. 3 is a flow diagram illustrating a method for modifying operation of a home network based on one or more electric vehicles associated with the home network.

Thus, as described herein, the home network management system 150 may perform various methods, algorithms, routines or processes when managing operation of the home network 140. FIG. 3 is a flow diagram illustrating a method 300 for managing operation of the home network 140. The method 300 may be performed by the home network management system 150 and, accordingly, is described herein merely by way of reference thereto. It will be appreciated that the method 300 may be performed on any suitable hardware.

In operation 310, the home network management system 150 accesses information for an electric vehicle associated with a home network. For example, the information module 210 may access information received from the mobile device 110 and/or the electric vehicle 130. Example information may include information identifying a location of the electric vehicle 130 (e.g., a total distance between the location of the EV 130 and the home network 140), a route driven by the electric vehicle 130, an expected arrival time of the electric vehicle 130, information associated with a state of charge of the EV battery, and other information described herein.

In operation 320, the home network management system 150 determines current conditions of the home network. For example, the network module 220 may identify a current load condition applied to the home network 140 by one or more currently operating network devices 125A-B, a predicted load condition applied to the home network 140 by one or more network devices 125A-B scheduled to operate during future time periods, and so on.

In operation 330, the home network management system 150 performs an action to modify conditions of the home network 140 based on the information for the electric vehicle. The action module 230 may control operation of one or more of the network devices 125A-B, such as by turning on the devices, turning off the devices, causing the devices to operate at lowered power levels, and so on.

Example operations controlled by the action module 230 include:

Turning on an air conditioning or cooling device or system at a current time period in response to determining the electric vehicle 130 is expected to begin charging using the home network 140 at a later time period (e.g., pre-cooling one or more rooms of the home);

Turning on a heating system at a current time period in response to determining the electric vehicle 130 is expected to begin charging using the home network 140 at a later time period (e.g., pre-heating one or more rooms of the home);

Turning off one or more network devices 125A-B upon determining the electric vehicle 130 is close to home and a battery of the electric vehicle 130 is at a low charge state (e.g., below a threshold of total charge, such as 10 or 20 percent), in anticipation of the electric vehicle immediately requiring charging upon returning home; and so on.

Thus, in some embodiments, the home network management system 150 manages a dynamic load (e.g., a load based on various different devices 125A-B and/or EVs 130) applied to the home network 140, in order to monitor, predict, shape, or otherwise impact the load applied to the home network 140.

In some embodiments, the home network management system 150 may charge the electric vehicle 140 at the charger 145 connected to the home electrical network 140 based on various current or predicted needs of the home network 140. For example, the home network management system 150 may determine that an operation condition associated with a total load currently applied to the home electrical system or network 140 by one or more devices 125A-B satisfies a threshold charging condition, and cause the charging station 145 to commence a charging event for the electric vehicle 130.

Figure 4:
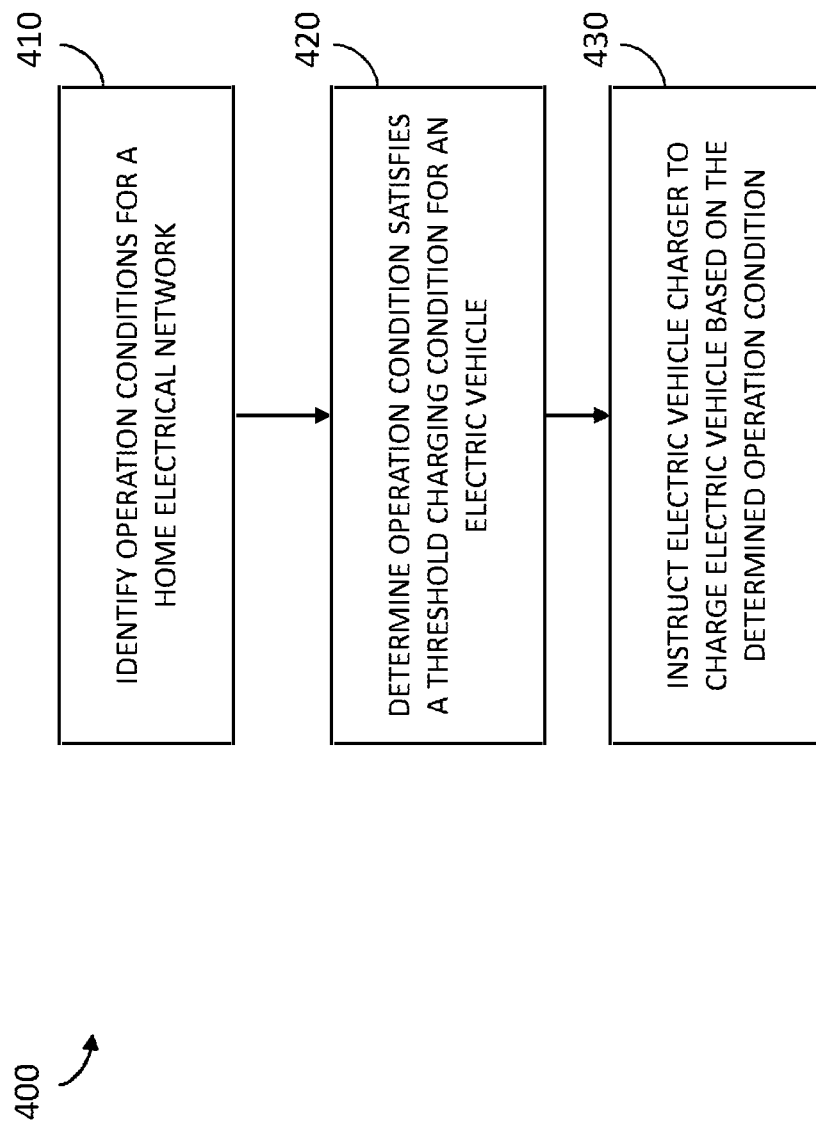
FIG. 4 is a flow diagram illustrating a method 400 for charging an electric vehicle via a home network.

FIG. 4 is a flow diagram illustrating a method 400 for charging an electric vehicle via a home network. The method 400 may be performed by the home network management system 150 and, accordingly, is described herein merely by way of reference thereto. It will be appreciated that the method 400 may be performed on any suitable hardware.

In operation 410, the system 150 identifies one or more operation conditions associated with a load applied to a home network. For example, the system 150 may identify a current load applied to an entire home network and/or to one or more circuits (e.g., general purpose circuits) of the home network 140.

In operation 420, the system 150 determines that an operation condition associated with a total load currently applied, or expected to be applied, to the home electrical system or network 140 by one or more devices satisfies a threshold charging condition. For example, the system 150 may determine that the total load applied and expected to be applied to the home network 140 for a current and future time period is below a threshold load condition.

In operation 430, the system 150 causes the charging station 145 to charge the electric vehicle. For example, the charging station 145 may be controlled by the home network management system 150, which sends instructions to the charging station 145 to begin charging an associated EV, to pause charging of an EV, to stop charging of an EV, to commence charging of an EV, to charge an EV at a lower charging levels (e.g., different kW levels), and so on.

As an example, an electric vehicle arrives home and plugs into the driver's home network via the charger 145. The system 150 determines (or, tracks) a current load condition of the home or one or more device 125A-B, and instructs the charger 145 to not charge the electric vehicle until the current load condition lowers. Once it lowers, the system 150 sends instructions to the charger 150 (or, in some cases, a device within the EV) to begin charging the electric vehicle.

Thus, the systems and methods described herein enable a home electrical system to efficiently and during suitable load conditions provide power to various load devices connected to the home electrical system. For example, the systems described herein may anticipate and/or predict use of the home electrical system by an electric vehicle, and cause heating and/or air conditioning systems to operate out of normally scheduled time periods (before and after the electric vehicle uses the home electrical system to charge), in order to shape or smooth the load applied to the home electrical system, among other benefits.

Examples of a Suitable Computing Environment

Figure 5:
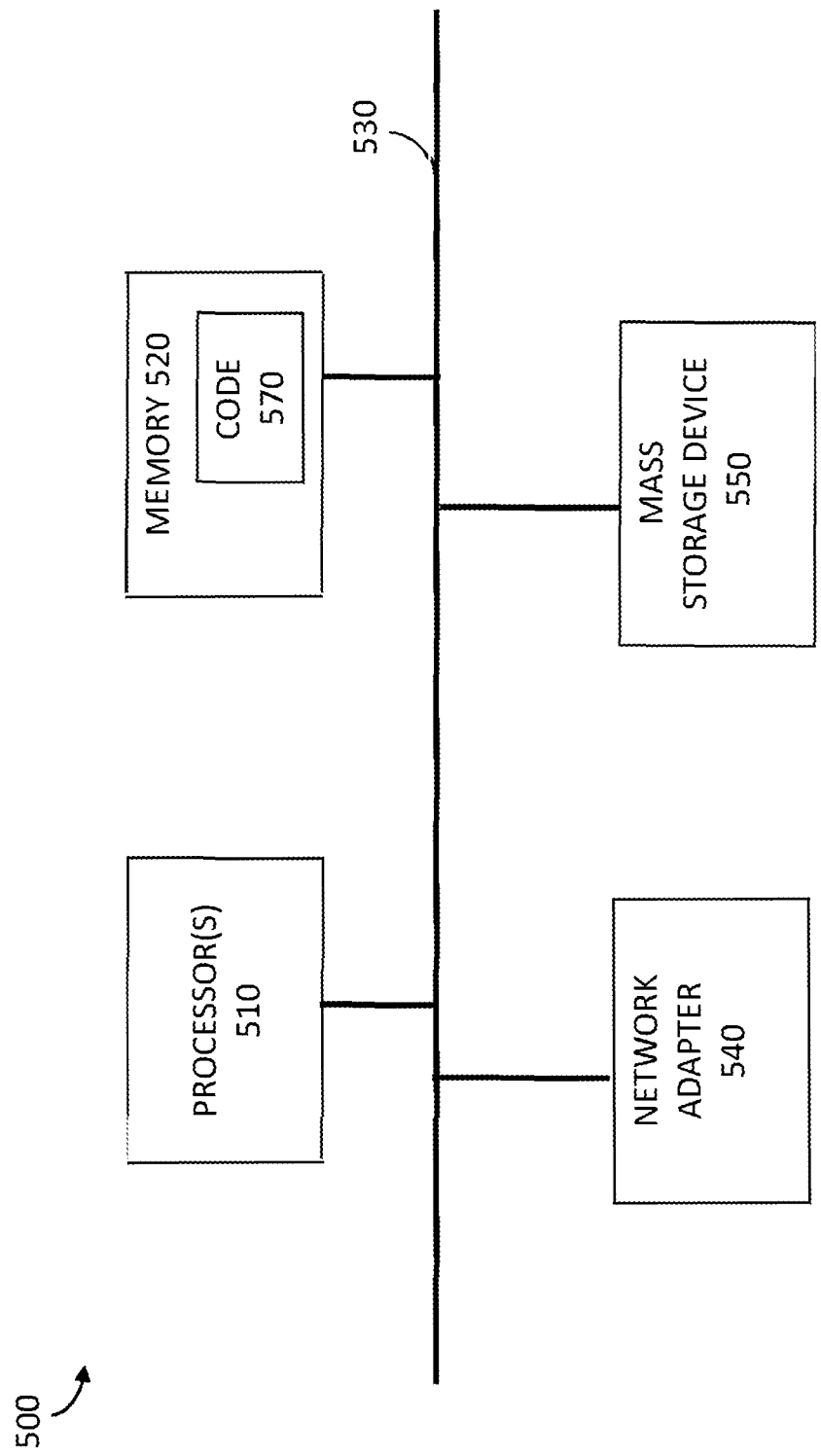
FIG. 5 is a block diagram illustrating components of a suitable computing device.

FIG. 5 illustrates a high-level block diagram showing an example architecture of a computer 500, which may represent any electronic device, such as a mobile device or a server, including any node within a cloud service as described herein, and which may implement the operations described above. The computer 500 includes one or more processors 510 and memory 520 coupled to an interconnect 530. The interconnect 530 may be an abstraction that represents any one or more separate physical buses, point to point connections, or both connected by appropriate bridges, adapters, or controllers. The interconnect 530, therefore, may include, for example, a system bus, a Peripheral Component Interconnect (PCI) bus or PCI-Express bus, a Hyper- Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 510 is/are the central processing unit (CPU) of the computer 500 and, thus, control the overall operation of the computer 500. In certain embodiments, the processor(s) 510 accomplish this by executing software or firmware stored in memory 520. The processor(s) 510 may be, or may include, one or more programmable general-purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices.

The memory 520 is or includes the main memory of the computer 500. The memory 520 represents any form of random access memory (RAM), read-only memory (ROM), flash memory, or the like, or a combination of such devices. In use, the memory 520 may contain code 570 containing instructions according to the techniques disclosed herein.

Also connected to the processor(s) 510 through the interconnect 530 are a network adapter 540 and a mass storage device 550. The network adapter 540 provides the computer 500 with the ability to communicate with remote devices over a network and may be, for example, an Ethernet adapter. The network adapter 540 may also provide the computer 500 with the ability to communicate with other computers.

The code 570 stored in memory 520 may be implemented as software and/or firmware to program the processor(s) 510 to carry out actions described above. In certain embodiments, such software or firmware may be initially provided to the computer 500 by downloading it from a remote system through the computer 500 (e.g., via network adapter 540).

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

While many embodiments described above employ software stored on the mobile device, the scripts and other software noted above may be hard coded into the mobile device (e.g. stored in EEPROM, PROM, etc.). Further, the above functionality may be implemented without scripts or other special modules.

The teachings of the system provided herein can be applied to other systems, not necessarily the system described above. The elements and acts of the various embodiments described above can be combined to provide further embodiments.

All of the above patents and applications and other references, including any that may be listed in accompanying filing papers, are incorporated by reference. Aspects of the system can be modified, if necessary, to employ the systems, functions, and concepts of the various references described above to provide yet further embodiments of the system.

These and other changes can be made to the system in light of the above Detailed Description. While the above description details certain embodiments of the system and describes the best mode contemplated, no matter how detailed the above appears in text, the system can be practiced in many ways. Details of the local-based support system may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the inventors contemplate the various aspects of the system in any number of claim forms. Accordingly, the inventors reserve the right to add additional claims after filing the application to pursue such additional claim forms for other aspects of the system.

We claim:

1. A computerized method for shaping a load applied to a home electrical network, the method comprising:
   receiving a request to charge a battery of an electric vehicle via the home electrical network; and
   before charging the battery of the electric vehicle via the home electrical network, performing multiple actions to shape a current load condition applied to the home electrical network by multiple home network devices of the home electrical network, including:
   shutting off operation of at least one home network device of the multiple home network devices; and turning on operation of at least one different home network device of the multiple home network devices.

2. The computerized method of claim 1, further comprising:
    determining, in response to the received request, current load conditions applied to the home electrical network based on the multiple home network devices operating on the home electrical network do not satisfy a suitable charging condition for charging the electric vehicle using the home electrical network; and
    performing the multiple actions to modify the current load conditions applied to the home electrical network.

3. The computerized method of claim 1, wherein the multiple actions to shape the current load condition are performed in response to a determination that the current load condition does not satisfy a suitable load condition for charging electric vehicles via the home electrical network.

4. The computerized method of claim 1, wherein the received request identifies a future time period for a charging event that provides power to the battery of the electric vehicle from the home electrical network.

5. The computerized method of claim 1, wherein the received request identifies a location of the electric vehicle with respect to a location of the home electrical network.

6. The computerized method of claim 1, wherein the received request identifies a state of charge of the battery of the electric vehicle.

7. The computerized method of claim 1, wherein performing multiple actions to shape a current load condition applied to the home electrical network includes causing a home heating system or a home cooling system to pause current operations.

8. The computerized method of claim 1, wherein the current load condition is based on an electrical load applied to the home electrical network by a home heating system or a home cooling system.

9. A non-transitory, computer-readable medium whose contents, when executed by a computing system of a home electrical network, cause the home electrical network to perform a method, the method comprising:
    receiving a request to charge a battery of an electric vehicle via the home electrical network; and
    before charging the battery of the electric vehicle via the home electrical network, performing multiple actions to shape a current load condition applied to the home electrical network by multiple home network devices of the home electrical network, including:
        shutting off operation of at least one home network device of the multiple home network devices; and
        turning on operation of at least one different home network device of the multiple home network devices.

10. The non-transitory, computer-readable medium of claim 9, further comprising:
    determining, in response to the received request, current load conditions applied to the home electrical network based on the multiple home network devices operating on the home electrical network do not satisfy a suitable charging condition for charging the electric vehicle using the home electrical network; and
    performing the multiple actions to modify the current load conditions applied to the home electrical network.

11. The non-transitory, computer-readable medium of claim 9, wherein the multiple actions to shape the current load condition are performed in response to a determination that the current load condition does not satisfy a suitable load condition for charging electric vehicles via the home electrical network.

12. The non-transitory, computer-readable medium of claim 9, wherein the received request identifies a future time period for a charging event that provides power to the battery of the electric vehicle from the home electrical network.

13. The non-transitory, computer-readable medium of claim 9, wherein the received request identifies a location of the electric vehicle with respect to a location of the home electrical network.

14. The non-transitory, computer-readable medium of claim 9, wherein the received request identifies a state of charge of the battery of the electric vehicle.

15. The non-transitory, computer-readable medium of claim 9, wherein performing multiple actions to shape a current load condition applied to the home electrical network includes causing a home heating system or a home cooling system to pause current operations.

16. The non-transitory, computer-readable medium of claim 9, wherein the current load condition is based on an electrical load applied to the home electrical network by a home heating system or a home cooling system.

* * * * *